Figure 1:
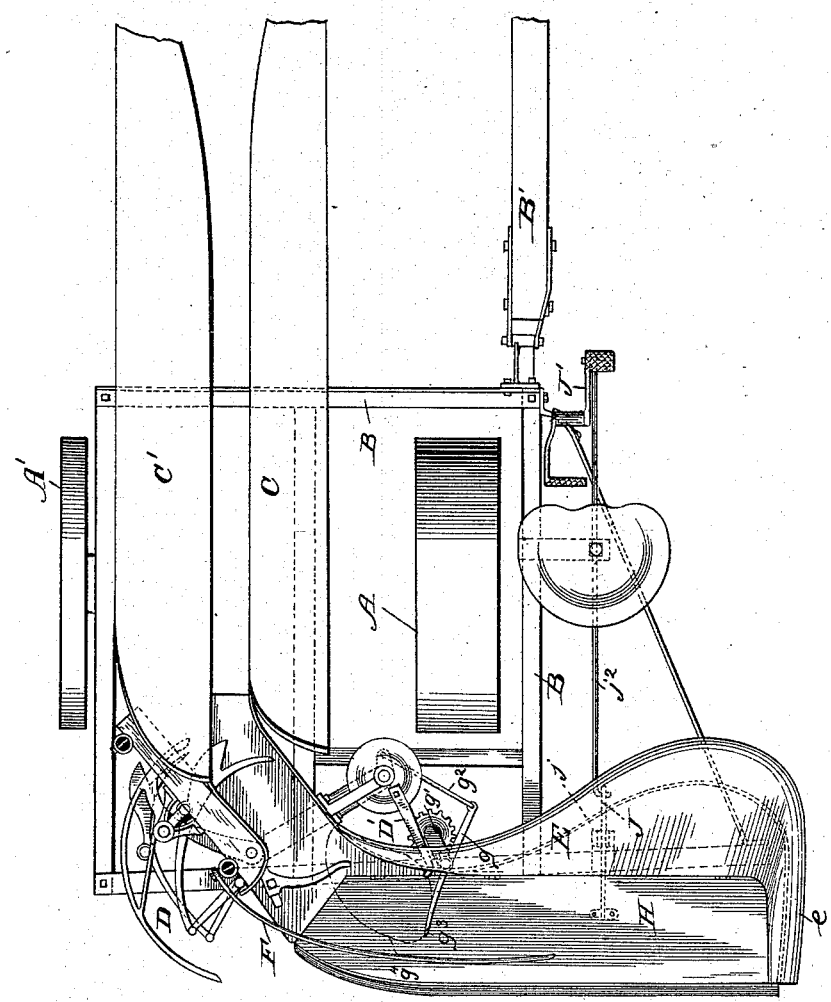

(No Model.) 3 Sheets—Sheet 1.

J. F. STEWARD.
SHEAF CARRIER FOR SELF BINDING HARVESTERS.

No. 573,244. Patented Dec. 15, 1896.

Witnesses
Arthur Johnson
Margaret T. Davis.

Inventor
John F. Steward

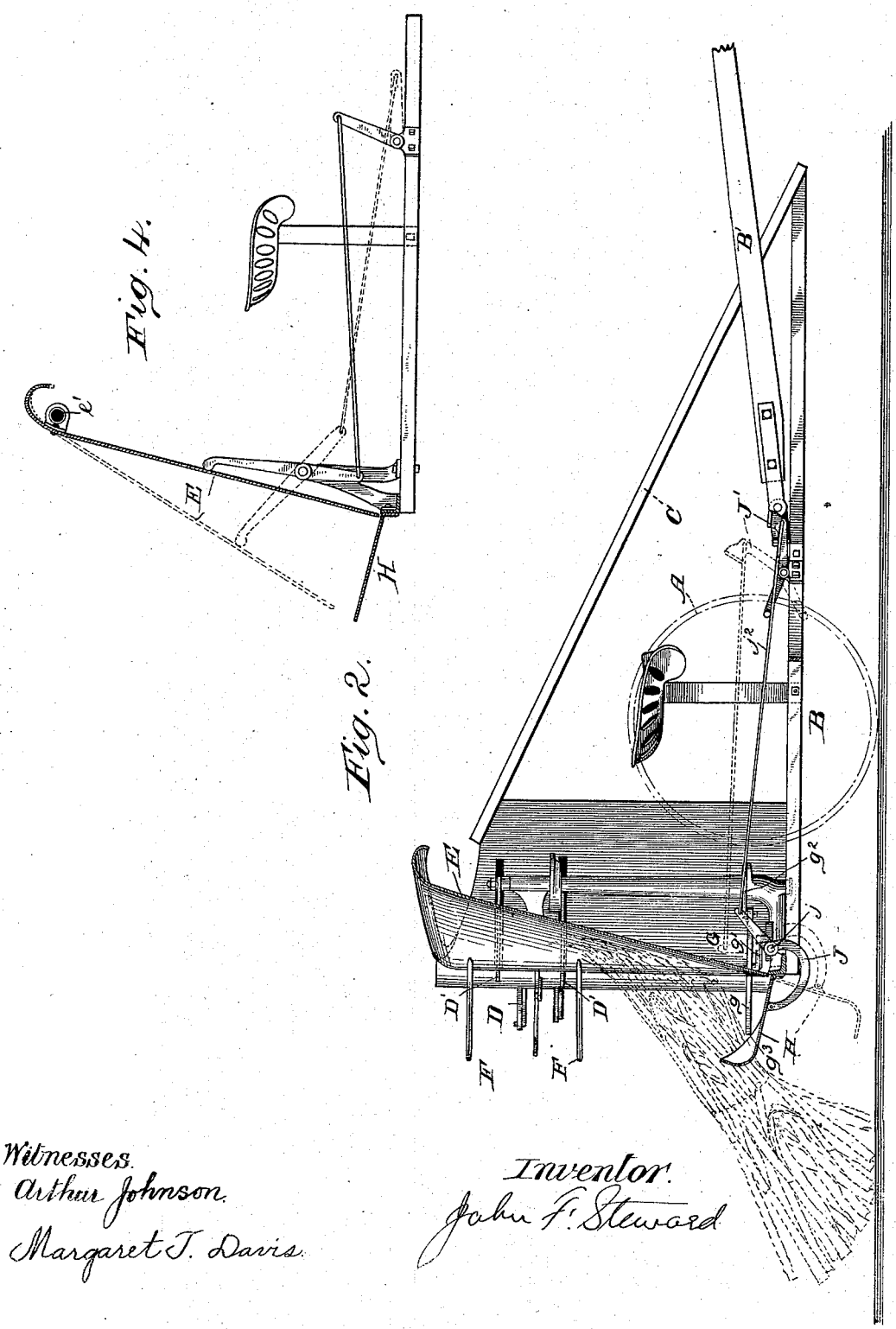

(No Model.) 3 Sheets—Sheet 3.
J. F. STEWARD.
SHEAF CARRIER FOR SELF BINDING HARVESTERS.
No. 573,244. Patented Dec. 15, 1896.
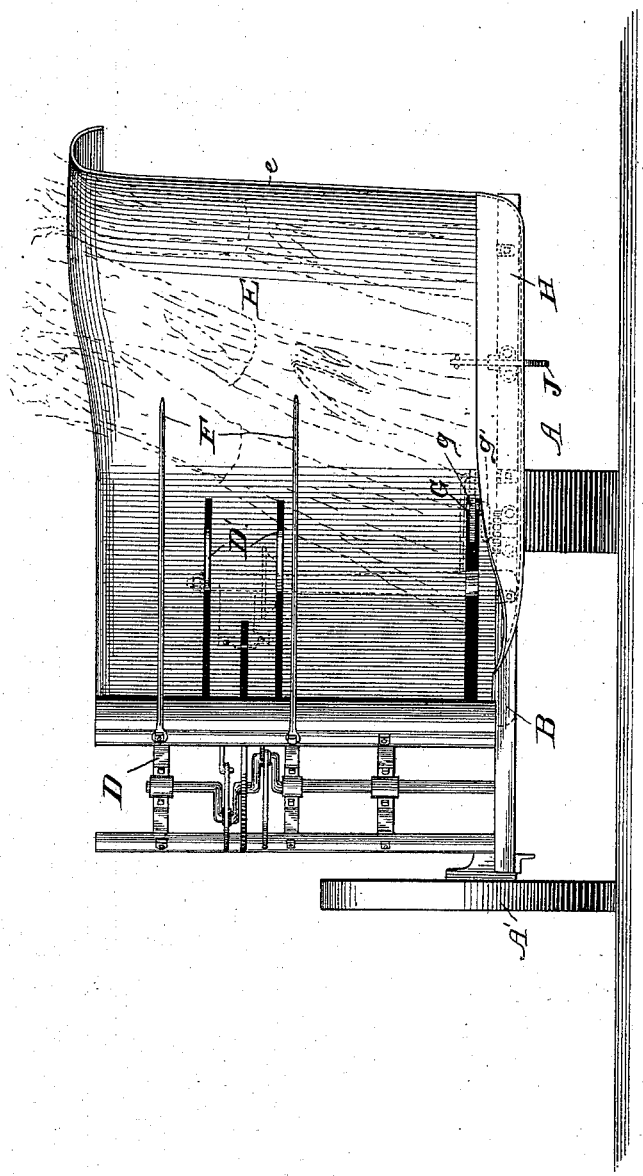
Witnesses.
Arthur Johnson.
Margaret T. Davis
Inventor.
John F. Steward

UNITED STATES PATENT OFFICE.

JOHN F. STEWARD, OF CHICAGO, ILLINOIS.

SHEAF-CARRIER FOR SELF-BINDING HARVESTERS.

SPECIFICATION forming part of Letters Patent No. 573,244, dated December 15, 1896.

Application filed June 19, 1895. Serial No. 553,378. (No model.)

*To all whom it may concern:*

Be it known that I, JOHN F. STEWARD, of Chicago, in the county of Cook and State of Illinois, have invented certain new and useful Improvements in Sheaf-Carriers for Self-Binding Harvesters, of which the following is a description, reference being had to the accompanying drawings, in which—

Figure 1 is a plan view. Fig. 2 is a sectional elevation. Fig. 3 is a rear elevation, and Fig. 4 is a side elevation showing a modification of my machine.

My invention as exemplified in the drawings is applicable to harvesters in which the stalks of corn or any grain being operated upon are cut and carried to the binder in substantially an upright position. It is shown as attached to a machine adapted to the cutting of corn when planted in rows.

In the drawings, A and A' are the carrying-wheels, B the main frame, and B' the tongue, of the harvester. The corn is gathered in the slot between the gatherers C and C' and carried by means of chains (not shown) or any of the well-known devices in an upright position to the binder D, which binder stands substantially vertical and may be considered as being any one of the kinds now found in general use and as being suitably supported and driven by ordinary means.

The bundles are discharged into a chute-like space between a wall E and a series of rods F. The wall E is made, preferably, of sheet metal or similar material, is substantially vertical at the binder side, and extends in a direction substantially transverse to the line of advance of the machine and toward the cut rows. As it extends stubbleward it is preferably given a forward inclination in order to allow the bundles to lie better thereagainst.

The rods F (two of which are shown) are preferably elastic and serve to guide the discharged bundles against the wall E and keep them from tipping over backward. The discharge-arms D' of the binding attachment, operating as they do about the center of gravity of the bundles, force them, still standing upon end, stubbleward.

To overcome the friction of the butts of the bundles upon the platform H, which tends to retard the butts, a butt-moving mechanism is provided which acts to force the butts of the bundles stubbleward, which action tends to straighten up the bundles if they incline to lean top stubbleward. As more bundles are discharged in the same manner, the device, still acting upon the last-discharged bundle, forces the lower ends of all the previously-discharged bundles stubbleward, as indicated by the dotted lines in Fig. 3.

I preferably use as a butt-moving device an arm $g$, carried upon a crank $g'$ and extending forwardly a short distance to a link $g^2$, having one end pivoted conveniently upon the binder-frame and connected at the other end to the said arm. As the crank is caused to revolve the point $g^3$ of the arm $g$ travels in an orbit $g^4$, substantially as indicated by broken lines in Fig. 1.

The crank $g'$ may be given rotation by the usual methods, and, if found desirable, may be driven by the intermittently-moving parts of the binding attachments and timed therewith. It is possible, however, to drive the device constantly but slowly, because if the arm should strike into the center of the butts of the bundles no ill results would follow.

The bundle-carrier platform H, which supports the bundles from beneath, is hinged at the bottom of the wall E conveniently upon the frame of the harvester and preferably has its rearward edge upturned to hold the butts of the bundles better from escaping. To discharge the load when a sufficient number of bundles have accumulated, the hinged platform H is swung down to the position shown in dotted lines in Fig. 2 by means of a device under the control of the operator. When this platform drops, the butts of the bundles strike the ground and the heads lean against the wall E and, as the machine advances, slide down said wall, finally dropping easily upon the ground. The platform is then erected to its normal position ready for a succeeding operation.

The preferable means for operating the hinged platform is shown in the drawings, in which J is a lever pivoted conveniently upon the main frame at $g$, having one arm extending rearwardly and connected to the platform H and a second arm connected by a link $j^2$ to a pedal-crank J', adjacent to the seat of the operator.

I have described the platform as being hinged in order that it may be moved from beneath the load; but I do not intend to limit my claims to the construction shown for removing it, because it is possible to operate said platform in various ways without departing from the principles of my invention.

It is obvious that without departing from the principles of my invention a machine may be constructed in which the relative movement of the wall E and the platform H with each other may be reversed when the operation of discharging the load is considered; that is to say, instead of removing the platform from beneath the bundles the wall may be swung rearwardly, and I shall so draw some of my claims as to cover this.

In regard to the construction which is illustrated in Fig. 4 the wall E is shown as being pivoted at a point near its upper end, as at $e'$, and the platform H is stationary. When the supporting-wall is swung to the dotted position shown in the last-mentioned figure, the bundles will be forced over the rear edge of the said platform H and drop to the ground, still leaning in substantially an upright position against the said wall. The continued forward movement of the machine will deposit the bundles easily upon the ground, or, in other words, will draw from beneath them in substantially the same way as when the platform H is rocked upon its hinges, as hereinbefore described. If the bundles be short, they may lean more or less stubbleward, but the operation of the carrier remains the same.

What I claim as my invention, and desire to secure by Letters Patent, is—

1. In combination a substantially vertical binder adapted to deliver the bundles in a substantially stubbleward direction, a bundle-carrier located on the stubble side of the binder and adapted to receive the said bundles and sustain them in an upright position, mechanism for moving the completed bundle from the said binder to the said bundle-carrier, said bundle-carrier having a removable platform upon which the butts of the said bundles rest, and tripping mechanism, substantially as described.

2. In combination, a substantially vertical binder, a bundle-support extending stubbleward therefrom onto which the bundles may be moved and there accumulate, said binder having ejecting-arms to operate upon the bundle adjacent to the position of the band placed therearound, the butt-moving mechanism adapted to slide the butts of the individual bundles upon the said bundle-support, means for permitting the said bundles to drop endwise to the ground, and tripping mechanism, substantially as described.

3. In combination, a substantially vertical binder, a bundle-support extending stubbleward therefrom upon which the bundles may be moved and there accumulate, and having a falling bottom, said binder having ejecting-arms to operate upon the bundle adjacent to the position of the band placed therearound, the butt-moving mechanism adapted to slide the butts of the individual bundles upon the said bundle-support, means for permitting the said bundles to drop endwise to the ground, and tripping mechanism, substantially as described.

4. In combination, a substantially vertical binder, a bundle-support extending stubbleward therefrom upon which the bundles may be moved and there accumulate, hinged at its forward margin and having the upturned rear margin, said binder having ejecting-arms to operate upon the bundle adjacent to the position of the band placed therearound and having the butt-moving mechanism adapted to slide the butts of the individual bundles upon the said bundle-support, and means for permitting the said bundles to fall endwise to the ground and draw from their support, and tripping mechanism, substantially as described.

5. In combination, a substantially vertical binder, a bundle receiver and carrier adapted to sustain the bundles in a substantially vertical position, said receiver and carrier having a forward limit against which the bundles may lean, a rearward limit to prevent the bundles from tipping rearward while being guided onto the receiver and carrier, and tripping mechanism, substantially as described.

6. In combination, a substantially vertical binder, a bundle receiving and carrying device, said device located on the stubbleward side of the binder and having a surface along which the bundles may be moved, supports to hold the bundles in their substantially erect position, said surface hinged at its front and adapted to fall at its rear edge, and thus permitting the butts of the bundles to strike the ground, and tripping mechanism, substantially as described.

JOHN F. STEWARD.

Witnesses:
FRANK G. WARD,
ARTHUR JOHNSON.